(12) United States Patent
Ackermann et al.

(10) Patent No.: US 7,628,178 B2
(45) Date of Patent: Dec. 8, 2009

(54) SAFETY DEVICE

(75) Inventors: Bernd Ackermann, Grossbettlingen (DE); Wolfgang Fassnacht, Sindelfingen (DE); Christoph Mueller, Sindelfingen (DE); Theo Schick, Esslingen (DE); Rolf-Dieter Walter, Esslingen (DE); Christian Weimer, Gaeufelden (DE)

(73) Assignee: Daimler AG, Stuttgart (DE)

( * ) Notice: Subject to any disclaimer, the term of this patent is extended or adjusted under 35 U.S.C. 154(b) by 382 days.

(21) Appl. No.: 10/920,451

(22) Filed: Aug. 18, 2004

(65) Prior Publication Data

US 2005/0076966 A1    Apr. 14, 2005

(30) Foreign Application Priority Data

Aug. 19, 2003    (DE) .................. 103 38 065

(51) Int. Cl.
*F16L 11/00*    (2006.01)
(52) U.S. Cl. .................. 138/110; 138/162; 138/163; 138/166; 138/168; 138/169
(58) Field of Classification Search .............. 138/110, 138/155, 162, 163, 166, 168, 169
See application file for complete search history.

(56) References Cited

U.S. PATENT DOCUMENTS

| | | | | | |
|---|---|---|---|---|---|
| 1,677,077 | A | * | 7/1928 | Fortune | 285/116 |
| 3,060,069 | A | * | 10/1962 | Sindars | 138/120 |
| 3,357,457 | A | * | 12/1967 | Myer | 138/166 |
| 3,583,424 | A | * | 6/1971 | Bryant | 138/156 |
| 3,711,633 | A | * | 1/1973 | Ghirardi et al. | 174/135 |
| 3,924,661 | A | * | 12/1975 | Bornhoffer | 138/110 |
| 4,181,157 | A | * | 1/1980 | DeCamp | 138/126 |
| 4,260,181 | A | * | 4/1981 | Curtin | 285/15 |
| 4,490,422 | A | * | 12/1984 | Pascher | 428/35.1 |
| 4,667,702 | A | * | 5/1987 | Roth | 138/162 |
| 4,951,716 | A | * | 8/1990 | Tsunoda et al. | 138/162 |
| 5,022,685 | A | * | 6/1991 | Stiskin et al. | 285/45 |
| 5,306,245 | A | * | 4/1994 | Heaven | 604/523 |
| 5,566,722 | A | * | 10/1996 | Bartholomew | 138/166 |
| 5,709,249 | A | * | 1/1998 | Okada et al. | 138/162 |
| 5,960,833 | A | * | 10/1999 | Der Manuelian | 138/112 |
| 6,001,081 | A | * | 12/1999 | Collen | 604/174 |
| 6,311,734 | B1 | * | 11/2001 | Petrovic | 138/110 |
| 6,378,549 | B1 | * | 4/2002 | Zapp | 137/315.01 |
| 6,508,275 | B1 | * | 1/2003 | Sadr et al. | 138/109 |

(Continued)

FOREIGN PATENT DOCUMENTS

DE    825 026    12/1951

(Continued)

OTHER PUBLICATIONS

German Office Action dated Mar. 6, 2008 with English Translation (Six (8) pages), 10338065.5-25.

*Primary Examiner*—James F Hook
(74) *Attorney, Agent, or Firm*—Crowell & Moring LLP

(57) ABSTRACT

In a safety device for a tank system with a tank pipe 1 which has a pliable region and a rigid region, a reinforcing element 7 is allocated to the rigid region of the tank pipe 1. The reinforcing element 7 is hollow and is in contact with the entire circumference of the tank pipe 1 with its interior contour.

13 Claims, 4 Drawing Sheets

U.S. PATENT DOCUMENTS

| | | | |
|---|---|---|---|
| 6,761,189 B2 * | 7/2004 | Berninger et al. | 138/157 |
| 7,441,565 B2 * | 10/2008 | Imamura et al. | 138/110 |
| 2003/0178086 A1 * | 9/2003 | Hu | 138/156 |
| 2005/0011568 A1 * | 1/2005 | Kagenow | 138/110 |

FOREIGN PATENT DOCUMENTS

| | | |
|---|---|---|
| DE | 36 35 469 A1 | 10/1986 |
| DE | 36 35 468 C2 | 10/1988 |
| DE | 44 37 918 A1 | 4/1996 |
| EP | 1 083 074 A2 | 3/2001 |

* cited by examiner

SAFETY DEVICE

BACKGROUND AND SUMMARY OF THE INVENTION

This application claims the priority of German patent document 103 38 065.5, filed Aug. 19, 2004, the disclosure of which is expressly incorporated by reference herein.

The invention concerns a safety device for a tank system having a tank pipe.

German patent document DE 36 35 468 C2 discloses a tank pipe having one end that faces a filler neck and another end that faces a fuel container. The tank pipe has a pliable region which includes an internal rubber hose and a bellows-like outer hose, to compensate for deformation in the event of an accident. The bellows-like outer hose allows for a sufficient deformation path for this purpose, while the internal rubber hose serves for a good flow behavior when filling the tank. If the elasticity of the inner rubber hose is exceeded in the event of an accident, the rubber hose tears on a target breakage site. The tightness of the tank pipe remains guaranteed since the elasticity of the outer hose is designed for large deformation pathways.

A tank pipe disclosed in German patent document DE 36 35 469 A1 has a filler neck or a fuel container arranged on ends thereof. The tank pipe likewise has a pliable region including two corrugated pipes with different strength inserted one into the other, to compensate for deformations. The internal corrugated pipe has a lesser strength than the outer corrugated pipe. While the outer corrugated pipe enables a sufficient deformation path for the action of force in the event of an accident, the inner corrugated pipe detaches from the outer corrugated pipe in response to a specified force.

To summarize, the tank pipes known from the state of the art include a pliable region having two pipes lying one inside the other to compensate for deformations arising in the event of an accident.

One object of the present invention is to provide a tank pipe which offers enhanced safety for those involved in traffic in the event of a collision.

This and other objects and advantages are achieved by the safety device according to the invention, which consists of a hollow reinforcing element that is attached externally on the tank pipe. The reinforcing element conforms to the tank pipe so that it is in contact therewith over its entire circumference. (However, within the scope of the invention, it is also possible for the reinforcing element to be only partially in contact with the tank pipe.) The reinforcing element has a stiffening function.

Due to a separate mode of construction of tank pipe and reinforcing element, different materials can be used for the two components. This way the positive characteristics of the individual materials can be combined with each other. Furthermore the tank pipe can be used for different types of motor vehicles, and reinforced individually with the reinforcing element on the particularly endangered places for the respective type of motor vehicle. In the event of an accident, motor vehicle parts arranged in the vicinity of the tank pipe can come into contact with and damage to the tank pipe. Due to the special stiffening on the endangered region of the tank pipe, the tank pipe is protected from this type of damage.

In one embodiment, the reinforcing element has a basically circular cross section that is constant over its entire length. In this way, the reinforcing element and the tank pipe (which in this embodiment likewise has a constant circular cross section) are harmonized with each other, with the inside diameter of the reinforcing element corresponding to the outside of the tank pipe. The reinforcing element encloses the tank pipe like a second skin and in this way requires little space. Furthermore, the reinforcing element has a particularly stable construction due to the constant cross section in the longitudinal direction.

It is, however, also possible within the scope of the invention that the cross section of the reinforcing element is not constant over the its length, but is tapered, for example. In this way, the reinforcing element can be individually adapted to different tank pipes and the tank pipe can be freely configured. Likewise curvatures of the tank pipe can be taken into consideration in manufacturing the reinforcing element.

In order to install the reinforcing element simply and rapidly on the tank pipe, it consists of several separate components according to a further embodiment. Two sleeves can be provided as components, which are applied from the exterior to opposite sides of the tank pipe and thereby enclose it. The sleeves have a basically semicircular cross section. The longitudinal axis of the reinforcing element corresponds to the longitudinal axis of the tank pipe (which can be manufactured independently of the reinforcing element). Time is saved and costs can be reduced due to rapid installation. Providing three or four sleeves as reinforcing elements that are joined with one another during assembly is also possible. In this way, the reinforcing element can be adapted to the shape of the tank pipe.

The sleeves have recesses for accommodating fastening fixtures in accordance with a further embodiment. The installation is simplified in this way because the fastening points are already specified and fastening fixtures can simply be inserted into the receptacles.

In a further embodiment, the fastening fixtures are constructed in one piece with the tank pipe, for example, as elevations on the tank pipe. In this way, the reinforcing element can simply be clipped onto the tank pipe in one assembly step, and can also be released again. The elevations are constructed such that they snap into the recesses of the reinforcing element. The snap-fit can take place through a projection that is mounted on the elevation. This has the advantage that no additional fastening fixtures are needed for assembly, so that costs are saved. But other fastening possibilities of the sleeves are also possible, such as, for example, a gluing connection or a screwing connection.

The recesses are constructed trapezoid-like in a further embodiment.

In another embodiment, the boundary regions of the sleeves facing one another delimit a meandering separation line. For this purpose, the boundary regions of the sleeves have trapezoidal regions, and are harmonized with one another such that they engage into one another, but do not come into contact, following the installation of the tank pipe. In this way, they prevent sliding of the two sleeves toward one another in a longitudinal direction.

The fastening fixtures are constructed in one piece with one of the sleeves in a further embodiment, so that no additional fastening fixtures are needed, and costs as well as time are saved in installation. For example, the boundary regions of one of the sleeves can be bent outwardly as a fastening fixture. The sleeve has individual projecting boundary regions for this purpose that are bent toward the outside on their ends. These ends can be used as hooks or hinges for joining the two sleeves. This is a type of fastening fixture, which is simple to manufacture.

In accordance with a further embodiment, one of the sleeves has peripherally extending projections that have recesses for accommodating fastening fixtures. That is, the projections are tongue-like boundary regions of the sleeves, with recesses that are parallel to the longitudinal axis of the sleeve. The recesses can, for example, be constructed as oblong holes so that the bent boundary regions of the other sleeve can hook into the recesses, providing a simple detachable connection. The recesses may, of course, have other shapes, such as, for example, circular or rectangular. The fastening fixtures that are to be accommodated into the recesses are correspondingly adapted.

Other objects, advantages and novel features of the present invention will become apparent from the following detailed description of the invention when considered in conjunction with the accompanying drawings.

DETAILED DESCRIPTION OF THE DRAWINGS

Figure 1:
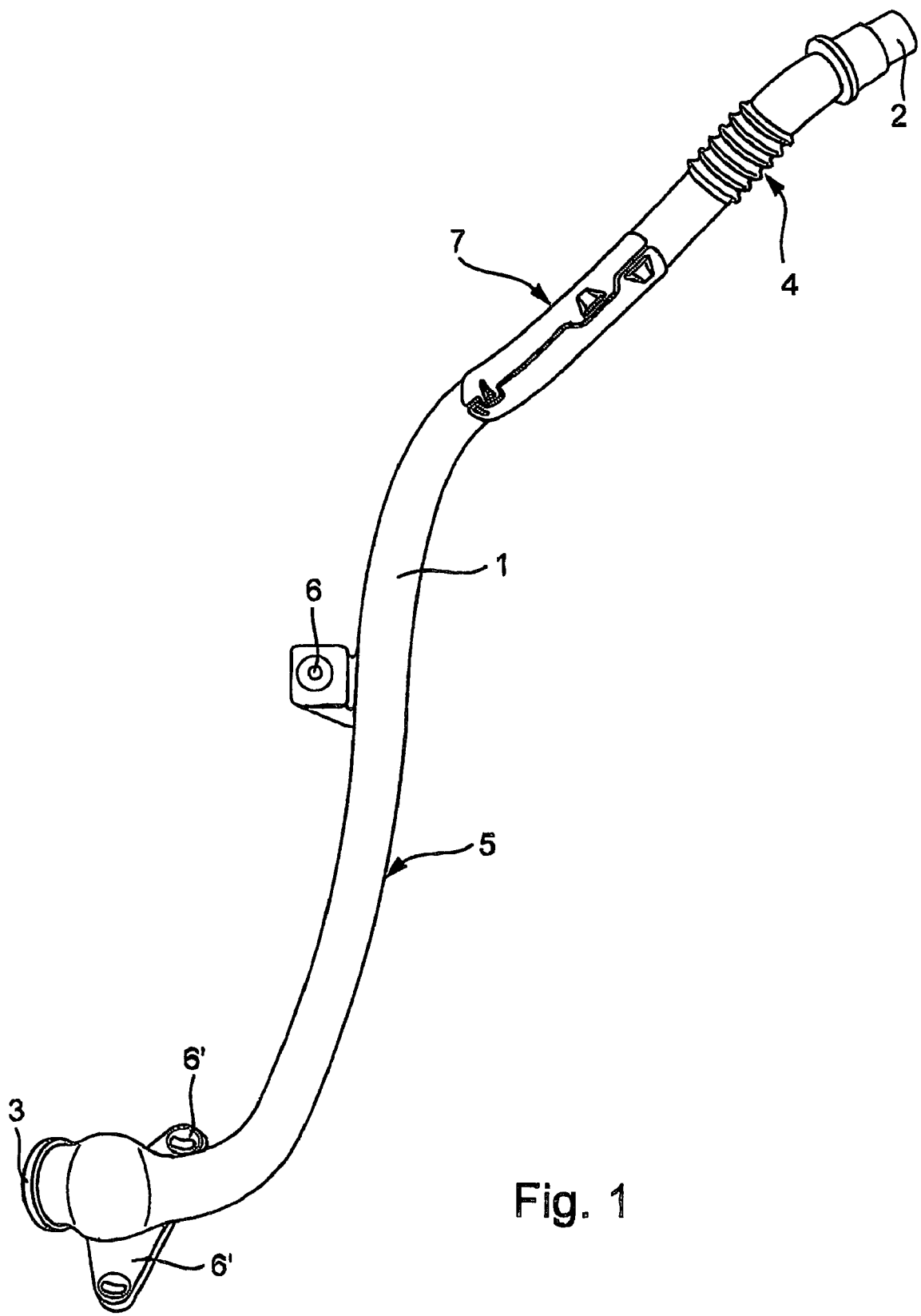
FIG. 1 is a perspective view of a tank pipe with a reinforcing element.

In FIG. 1, a tank pipe 1 is fastened to a filler neck (not shown) at one end 2, while the other end 3 is joined with a fuel container (also not shown). The tank pipe 1 has a pliable region 4 which is arranged beneath end 2 and is shaped like a bellows to increase the capacity for deformation, and a rigid region 5 which extends between the end 3 facing the fuel container and the pliable region 4 of the tank pipe 1. Devices 6, 6' for fastening the tank pipe 1 to the motor vehicle body are installed on the rigid region 5. A reinforcing element 7 is fastened between the fastening fixture 6 and the pliable region 4 of the tank pipe.

Figure 2:
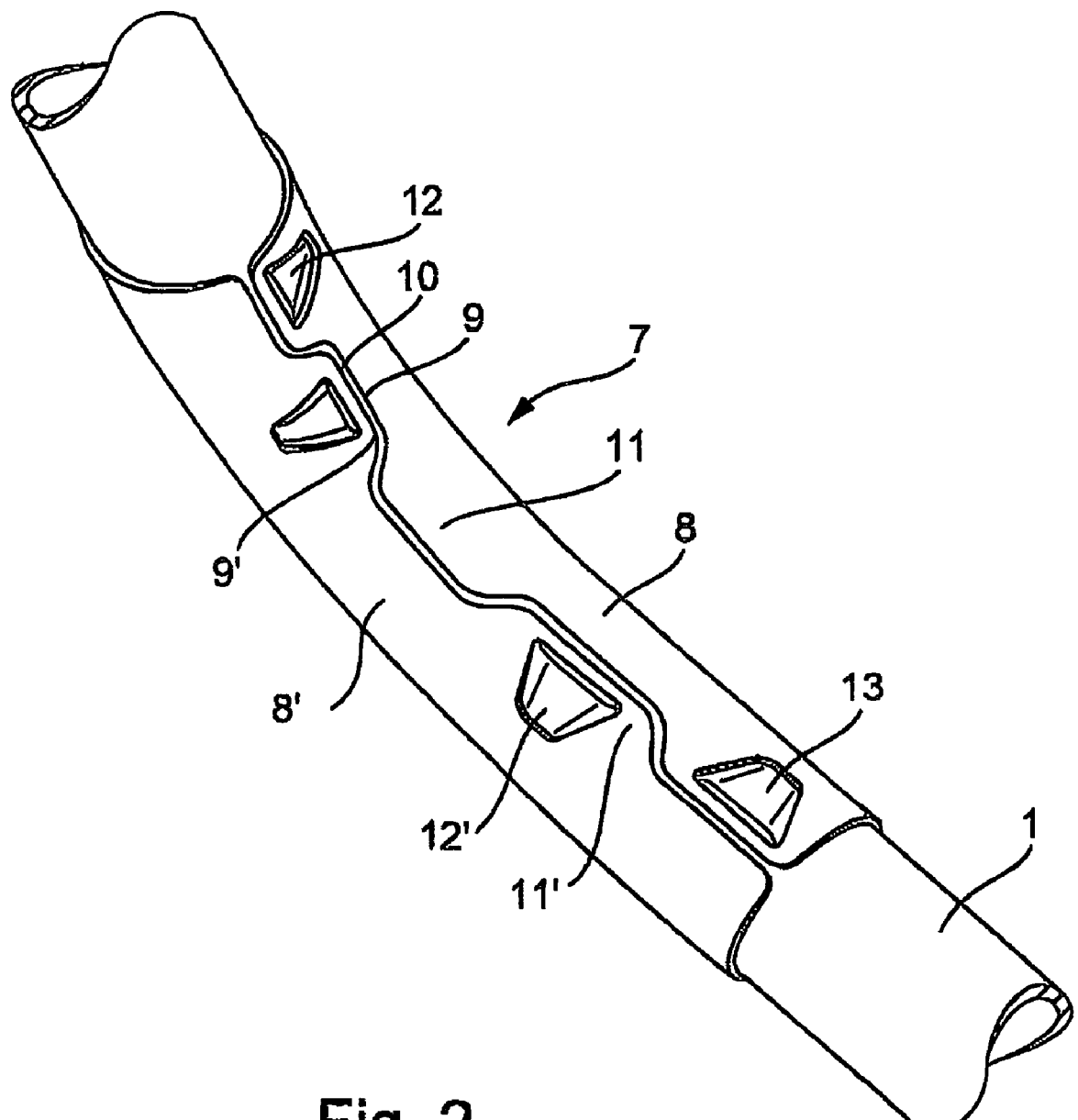
FIG. 2 is a perspective detailed view of the tank pipe with the reinforcing element in accordance with FIG. 1.

FIG. 2 illustrates the tank pipe 1 in accordance with FIG. 1 in the region of the reinforcing element 7. The latter consists of two sleeves 8, 8' with a semicircular cross section in each case, such that the inside diameter of the sleeves 8, 8' corresponds to the outside diameter of the tank pipe 1. The sleeves 8, 8' enclose the tank pipe 1 from two opposite sides so that their lateral edges 9, 9' facing each other respectively form a separating line 10. The lateral edges 9, 9' of the sleeves 8, 8' have tongue-like projections 11, 11', which are arranged offset in relation toward one another and engage without touching in this connection. The separation line 10 in this way meanders along the longitudinal axis of the tank pipe 1.

Trapezoid recesses 12, 12', incorporated into the sleeves 8, 8', are arranged in the projections 11, 11'. The tank pipe 1 has trapezoid-like elevations 13 corresponding to the recesses 12, 12' for fastening the sleeves 8, 8' on the tank pipe 1. The sleeves 8, 8' are arranged on the tank pipe 1 such that the elevations 13 on the tank pipe 1 snap into the recesses 12, 12' on the sleeves 8, 8' and in this way fix the sleeves 8, 8' into position on the tank pipe.

Figure 3:
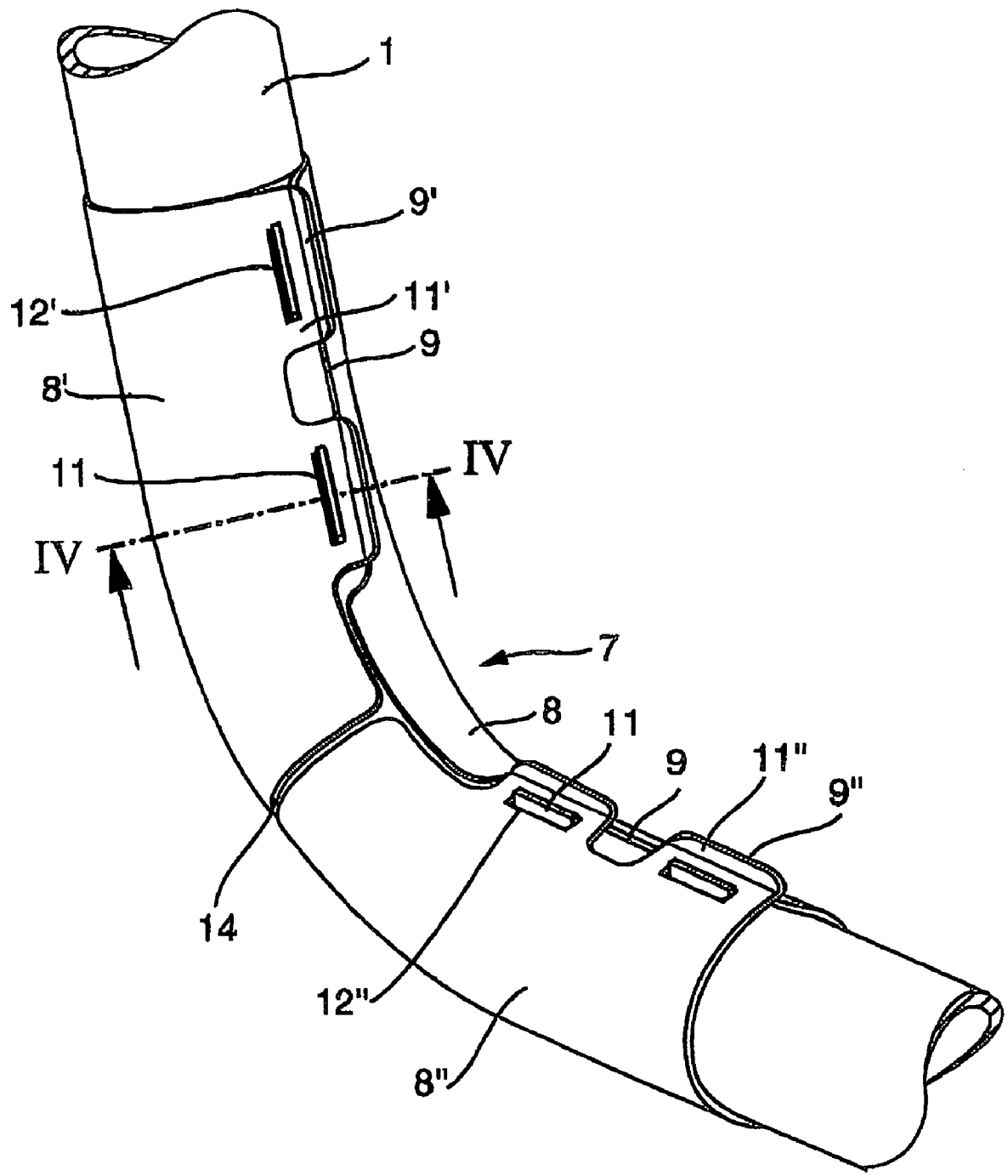
FIG. 3 is a perspective view of a tank pipe with a further embodiment of a reinforcing element.

A further embodiment of the reinforcing element of the invention 7 is shown in FIG. 3. Contrary to the embodiment represented in FIG. 2, this reinforcing element 7 consists of three sleeves 8, 8', 8", whereby the sleeve 8 extends over the entire length of the reinforcing element 7, and each of the sleeves 8', 8" extends over half the length of the reinforcing element 7. The sleeves 8', 8" are arranged consecutively to one another on one side of the tank pipe 1. In this way, the two sleeves 8', 8" define a separation line 14 oriented transversely in relation to the longitudinal axis. The lateral edges 9, 9' of the sleeves 8', 8" respectively have two tongue-like projections 11', 11" that are bent on one side of the sleeves 8', 8" on their outer end. Oblong openings 12', 12" are incorporated into the lugs 11', 11" beside the bent region. The lateral edge 9 of sleeve 8 facing lateral edges 9', 9" of the sleeves 8', 8" has on both sides four tongue-like projections 11 that engage into the oblong hole-like recesses 12', 12" of the sleeves 8', 8". In this way, the sleeves 8, 8', 8" are fastened to one another and fixed into position on the tank pipe 1.

Figure 4:
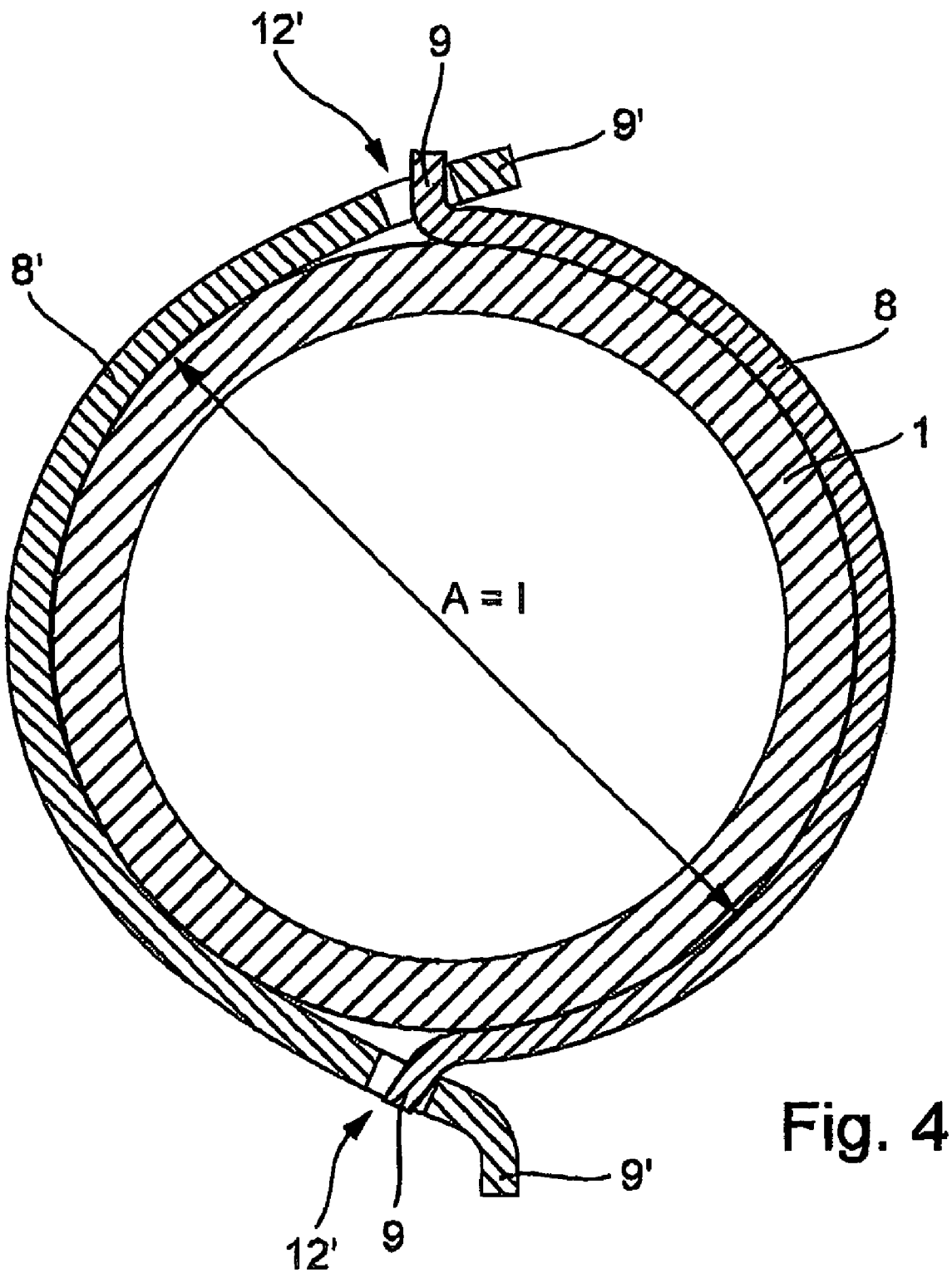
FIG. 4 is a cross section of the tank pipe in the region of the reinforcing elements in accordance with FIG. 3 along a line IV-IV.

FIG. 4 illustrates a section IV-IV through the tank pipe 1 in the region of the reinforcing element 7 in accordance with FIG. 3. The tank pipe 1 has a circular cross section and is halfway enclosed by the sleeves 8, 8' on respectively opposite sides so that the lateral edges 9, 9' of the sleeves 8, 8' respectively facing each other partially overlap. Since the outside diameter A of the tank pipe 1 corresponds to the inside diameter I of the sleeves 8, 8', the sleeves are in contact with the outside contour of the tank pipe 1 with their inside contour. The lateral edge 9 of sleeve 8 represented in FIG. 4 above is bent toward the outside and engages from inside into the recesses 12' of the sleeve 8'. In this way, the bent lateral edge 9 of the sleeve 8 can interact as a hinge with the recess 12' of the sleeve 8' during installation. Subsequently the recess 12' is brought into engagement with the bent lateral edge 9 of the sleeve 8 on the opposite side with the aid of the bent lateral edge 9'.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A safety apparatus for a tank system which includes a tank pipe having one end for connecting to a filler neck and another end for connecting to a fuel container, a pliable region to compensate for deformations arising in the event of an accident, and a rigid region, said safety apparatus comprising a reinforcing element having a plurality of sleeve elements allocated to the rigid region, each of said sleeve elements having a substantially semicircular cross section and a plurality of circumferentially extending tongues with openings defined therein, wherein:

an interior contour of the reinforcing element conforms to an outer contour of the tank pipe;

the sleeve elements are arranged on opposite sides of the tank pipe so as to enclose an outer circumference of the tank pipe;

each of the sleeve elements has a plurality of lateral edges separated along separating lines from a plurality of facing lateral edges of at least one other of the sleeve elements without touching those facing lateral edges; and projections, protruding radially through the openings, are receivable in said openings defined in said tongues.

2. The safety apparatus according to claim 1, wherein the reinforcing element has a substantially circular cross section that is constant over its length.

3. The safety apparatus according to claim 1, wherein the tank pipe and the reinforcing element are made of different materials.

4. The safety apparatus according to claim 1, wherein all of the sleeve elements have openings for accommodating said projections.

5. The safety apparatus according to claim 4, wherein the projections are constructed in one piece with the tank pipe.

6. The safety apparatus according to claim 4, wherein the projections are outward projecting contours of the tank pipe.

7. The safety apparatus according to claim 4, wherein the openings are substantially constructed trapezoidal.

8. The safety apparatus according to claim 4, wherein the projections are constructed in one piece with one of the sleeve elements.

9. The safety apparatus according to claim 8, wherein the projections are bent boundary regions of one of the sleeve elements.

10. The safety apparatus according to claim 1, wherein each of the separating lines is a meandering separating line.

11. The safety apparatus according to claim 1, wherein the openings comprise oblong holes.

12. The safety apparatus according to claim 1, wherein boundary regions of the tongues are bent.

13. The safety apparatus according to claim 1, wherein a pair of the separating lines are located on circumferentially opposing locations of the tank pipe.

* * * * *